(12) United States Patent
Amitay et al.

(10) Patent No.: US 7,792,827 B2
(45) Date of Patent: Sep. 7, 2010

(54) TEMPORAL LINK ANALYSIS OF LINKED ENTITIES

(75) Inventors: Einat Amitay, Timrat (IL); David Carmel, Haifa (IL); Michael Herscovici, Haifa (IL); Ronny Lempel, Haifa (IL); Aya Soffer, Haifa (IL); Uri Weiss, D.N Eilot (IL)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/335,357

(22) Filed: Dec. 31, 2002

(65) Prior Publication Data

US 2004/0128273 A1 Jul. 1, 2004

(51) Int. Cl.
G06F 17/30 (2006.01)

(52) U.S. Cl. ........................ 707/726; 707/727; 707/728; 709/217; 709/218; 715/205; 715/208

(58) Field of Classification Search .................. 707/10, 707/103, 104.1, 999.001, 999.01, 999.107; 709/217, 218; 714/205, 208
See application file for complete search history.

(56) References Cited

U.S. PATENT DOCUMENTS

| | | | | |
|---|---|---|---|---|
| 5,404,534 A * | 4/1995 | Foss et al. | .................... | 719/315 |
| 5,694,594 A * | 12/1997 | Chang | ............................ | 707/6 |
| 5,724,595 A * | 3/1998 | Gentner | ....................... | 715/206 |
| 5,794,257 A * | 8/1998 | Liu et al. | ..................... | 715/205 |
| 5,809,317 A * | 9/1998 | Kogan et al. | ................. | 715/236 |
| 5,835,905 A * | 11/1998 | Pirolli et al. | ..................... | 707/3 |
| 5,857,211 A * | 1/1999 | Carper et al. | ............... | 715/236 |
| 5,995,099 A * | 11/1999 | Horstmann | .................. | 715/205 |
| 6,065,055 A * | 5/2000 | Hughes et al. | .............. | 709/229 |
| 6,092,074 A * | 7/2000 | Rodkin et al. | ................ | 707/102 |
| 6,122,649 A * | 9/2000 | Kanerva et al. | .............. | 715/210 |
| 6,144,973 A * | 11/2000 | Fujii et al. | ................... | 715/222 |
| 6,163,778 A * | 12/2000 | Fogg et al. | ..................... | 707/10 |
| 6,189,019 B1 * | 2/2001 | Blumer et al. | ............... | 715/205 |
| 6,229,535 B1 * | 5/2001 | Tokuda | ......................... | 715/760 |
| 6,256,028 B1 * | 7/2001 | Sanford et al. | .............. | 715/841 |
| 6,285,999 B1 * | 9/2001 | Page | .............................. | 707/5 |
| 6,317,787 B1 * | 11/2001 | Boyd et al. | .................. | 709/224 |
| 6,381,637 B1 * | 4/2002 | Kamada | ...................... | 709/218 |
| 6,442,567 B1 * | 8/2002 | Retallick et al. | .......... | 707/104.1 |
| 6,470,383 B1 * | 10/2002 | Leshem et al. | .............. | 709/223 |
| 6,631,496 B1 * | 10/2003 | Li et al. | ....................... | 715/200 |
| 6,633,316 B1 * | 10/2003 | Maddalozzo et al. | ........ | 715/854 |
| 6,638,314 B1 * | 10/2003 | Meyerzon et al. | ........... | 715/513 |
| 6,714,931 B1 * | 3/2004 | Papierniak et al. | ............ | 707/10 |
| 6,754,873 B1 * | 6/2004 | Law et al. | ................. | 715/501.1 |
| 6,766,422 B2 * | 7/2004 | Beyda | ......................... | 711/137 |
| 6,769,096 B1 * | 7/2004 | Kuppusamy et al. | ........ | 715/234 |
| 6,895,551 B1 * | 5/2005 | Huang et al. | ................. | 715/513 |
| 6,910,071 B2 * | 6/2005 | Quintero et al. | ............. | 709/224 |
| 7,010,742 B1 * | 3/2006 | Hsu et al. | .................... | 715/208 |
| 7,058,628 B1 * | 6/2006 | Page | .............................. | 707/5 |
| 7,100,109 B1 * | 8/2006 | Chartier | ...................... | 715/513 |
| 7,146,415 B1 * | 12/2006 | Doi | ............................. | 709/224 |
| 7,168,034 B2 * | 1/2007 | Hennings et al. | ......... | 715/500.1 |
| 7,194,469 B1 * | 3/2007 | Dowd et al. | ................... | 707/10 |
| 7,206,780 B2 * | 4/2007 | Slackman | ...................... | 707/7 |

(Continued)

Primary Examiner—Don Wong
Assistant Examiner—Thanh-Ha Dang

(57) ABSTRACT

A method for gathering and recording temporal information for a linked entity, the method including identifying a link related activity within a linked source entity, and recording a time stamp in association with the link related activity.

18 Claims, 7 Drawing Sheets

U.S. PATENT DOCUMENTS

| | | | | |
|---|---|---|---|---|
| 7,213,198 | B1* | 5/2007 | Harik | 715/234 |
| 7,246,122 | B2* | 7/2007 | Lucovsky | 707/10 |
| 7,257,598 | B2* | 8/2007 | Toivonen et al. | 707/102 |
| 7,281,005 | B2* | 10/2007 | Canright et al. | 707/5 |
| 7,299,270 | B2* | 11/2007 | Kolluri et al. | 709/218 |
| 7,333,966 | B2* | 2/2008 | Dozier | 706/21 |
| 7,386,792 | B1* | 6/2008 | Bascom et al. | 715/205 |
| 7,634,423 | B2* | 12/2009 | Brocklebank | 705/10 |
| 2001/0003214 | A1* | 6/2001 | Shastri et al. | 725/109 |
| 2001/0044820 | A1* | 11/2001 | Scott | 709/202 |
| 2002/0059333 | A1* | 5/2002 | Tribbeck | 707/500 |
| 2002/0059335 | A1* | 5/2002 | Jelbert | 707/500 |
| 2002/0065976 | A1* | 5/2002 | Kahn et al. | 711/1 |
| 2002/0069223 | A1* | 6/2002 | Goodisman et al. | 707/513 |
| 2003/0009464 | A1* | 1/2003 | Campbell et al. | 707/10 |
| 2004/0027349 | A1* | 2/2004 | Landau et al. | 345/440 |
| 2004/0075697 | A1* | 4/2004 | Maudlin | 345/848 |
| 2004/0077354 | A1* | 4/2004 | Jason et al. | 455/450 |

* cited by examiner

TEMPORAL LINK ANALYSIS OF LINKED ENTITIES

FIELD OF THE INVENTION

The present invention relates to the analysis of linked entities in general, and more particularly to temporal analysis of computer network-based linked documents.

BACKGROUND OF THE INVENTION

When working with collections of linked entities, such as documents that are accessible on the portion of the Internet known as the World Wide Web (hereinafter "the Web"), users generally desire to identify relevant documents, yet often have to manually sift through many documents in order to distinguish between relevant and irrelevant documents. In order to help users find relevant documents on the Web more efficiently, search engines, for example, have been designed to rank documents found in response to a query according to an estimation of relevance. In one such estimation technique, a document's relevance is deemed to be proportionate to the number of other documents that are linked to the document, either directly via a hypertext link, or indirectly via a chain of hypertext links.

In printed publications, such as scientific journals, time is considered one of the most important factors in distinguishing between subjects that are obsolete and those that are emerging. Relevance over time is a measure used by libraries to rank journals as part of their decision whether to subscribe or unsubscribe. Authors of scientific papers often decide where to publish their papers based on the current popularity of a journal, the importance of citations made to the journal, and how recently citations were made to the journal.

It has been shown that citations of journal articles behave in a consistent manner. In general, the more time passes the less citations a paper receives. In general, a journal will be considered more prominent the higher its citation half-life, i.e., how old are most of the papers currently cited in the literature that were previously published in the journal. A journal's impact-factor, or the frequency with which the average article in a given journal has been cited in a particular year, is also used by libraries to determine a journal's value. Since a journal's value can change over time, this evaluation is carried out periodically.

In contrast, when plotting similar measures for citations on the Web, the reverse behavior is exhibited: the more time passes the more citations a Web document receives. Furthermore, unlike printed publications, Web documents are often modified and updated with respect to current events. For example, when a country's government changes, the address of the official government Web site remains the same while its content is changed according to the wishes of the new government. This is in contrast to printed publications that become obsolete, or stale, over time and are then replaced by new, fresh documents.

Thus, in addition to the application of the aforementioned time-based relevance estimation techniques for printed publications not being known for Web-based documents, the manner of their application is not self-evident due to the disparate nature of Web-based documents and printed publications.

SUMMARY OF THE INVENTION

The present invention discloses the application of temporal analysis of linked entities, such as computer network-based Web documents, particularly with respect to the application of time-based relevance estimation techniques therefor. The present invention is motivated by the need to assist users in identifying information on the Web coupled with the recognition that as the amount of information accessible on the Web continues to grow, much of it becomes outdated and redundant. Moreover, it is recognized that the temporal behavior of linked entities can be used to mine and discover interesting trends. Thus, search results may be sorted and ranked based on temporal measurements, in addition to other measurements such as the similarity of web documents to the query or other known measurements. Additionally, linked entities may be ordered and profiled using information that indicates trends, such as by tracking the link activity related to a particular topic or document.

In one aspect of the present invention a method is provided for gathering and recording temporal information for a linked entity, the method including identifying a link related activity within a linked source entity, and recording a time stamp in association with the link related activity.

In another aspect of the present invention the method further includes creating a link activity record including an identifier of the source entity, an identifier of a destination of the link, and the time stamp.

In another aspect of the present invention the creating step includes creating the link activity record including an identifier of the activity.

In another aspect of the present invention the recording step includes recording a time stamp of when the link was added to the entity.

In another aspect of the present invention the recording step includes recording a time stamp of when anchor text of the link was modified.

In another aspect of the present invention the recording step includes recording a time stamp of when the location of the link within the entity was changed.

In another aspect of the present invention the recording step includes recording a time stamp of when the link is deleted.

In another aspect of the present invention the recording step includes recording a time stamp of when the entity was last modified.

In another aspect of the present invention the identifying step includes identifying among a collection of linked entities.

In another aspect of the present invention a method is provided for gathering temporal information for a linked entity, the method including examining a linking entity to identify any links contained therein, generating for any of the links a time stamp corresponding to a link related activity, subsequently examining the linking entity to determine whether the linking entity has changed since the previous examination, and if the linking entity has changed since the previous examination generating for any of the links a new time stamp corresponding to the change.

In another aspect of the present invention either of the generating steps includes generating according to the value of a last modified header field of the linking entity.

In another aspect of the present invention either of the generating steps includes generating according to when the linking entity was examined to identify the links.

In another aspect of the present invention the subsequently examining step includes comparing at least a portion of the linking entity with at least a portion of a previously stored version of the linking entity.

In another aspect of the present invention the subsequently examining step includes comparing the current value of the last modified header field to a previously stored value of the last modified header field.

In another aspect of the present invention the method further includes if the linking entity has been deleted since the previous examination, generating a new time stamp corresponding to when the deletion was detected.

In another aspect of the present invention a method is provided for measuring link activity as a function of time, the method including selecting a plurality of link activity records from a set of link activity records, and projecting the selected link activity records onto a time axis.

In another aspect of the present invention the selecting step includes selecting the link activity records that are limited to at least one type of activity.

In another aspect of the present invention the selecting step includes selecting the most recent link activity record for each link in the set.

In another aspect of the present invention the selecting step includes selecting based on predefined temporal criteria.

In another aspect of the present invention a method is provided for temporally ranking a collection of linked entities, the method including for each link activity record related to a link, assigning a weight to the link according to a temporal criterion applied to the link activity record, performing the assigning step for at least one link to each of a plurality of linked entities, and ranking the linked entities and associated links using the weights.

In another aspect of the present invention the assigning step includes assigning more weight to any of the links having either of more link activity records and more recent link activity records than to any of the links having either of fewer link activity records and fewer recent link activity records.

In another aspect of the present invention apparatus is provided for recording temporal information for a linked entity, including an identifier of a source entity including at least one link, an identifier of a destination of the link, and a time stamp indicating when an activity occurred that is associated with the link.

In another aspect of the present invention a system is provided for gathering and recording temporal information for a linked entity, the system including means for identifying a link related activity within a linked source entity, and means for recording a time stamp in association with the link related activity.

In another aspect of the present invention the system further includes means for creating a link activity record including an identifier of the source entity, an identifier of a destination of the link, and the time stamp.

In another aspect of the present invention the means for creating is operative to create the link activity record including an identifier of the activity.

In another aspect of the present invention a system is provided for gathering temporal information for a linked entity, the system including means for examining a linking entity to identify any links contained therein, means for generating for any of the links a time stamp corresponding to a link related activity, means for subsequently examining the linking entity to determine whether the linking entity has changed since the previous examination, and means for generating for any of the links a new time stamp corresponding to a change that occurred in the linking entity since the previous examination.

In another aspect of the present invention the means for subsequently examining is operative to comparing at least a portion of the linking entity with at least a portion of a previously stored version of the linking entity.

In another aspect of the present invention a system is provided for measuring link activity as a function of time, the system including means for selecting a plurality of link activity records from a set of link activity records, and means for projecting the selected link activity records onto a time axis.

In another aspect of the present invention the means for selecting is operative to selecting the link activity records that are limited to at least one type of activity.

In another aspect of the present invention a system is provided for temporally ranking a collection of linked entities, the system including means for assigning a weight to a link for each link activity record related to the link according to a temporal criterion applied to the link activity record, means for performing the assigning step for at least one link to each of a plurality of linked entities, and means for ranking the linked entities and associated links using the weights.

In another aspect of the present invention the means for assigning is operative to assign more weight to any of the links having either of more link activity records and more recent link activity records than to any of the links having either of fewer link activity records and fewer recent link activity records.

In another aspect of the present invention a computer program is provided embodied on a computer-readable medium, the computer program including a first code segment operative to identify a link related activity within a linked source entity, and a second code segment operative to record a time stamp in association with the link related activity.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Preferred embodiments of the present invention are now described with respect to linked entities, such as computer-network based linked documents that reside on the portion of the Internet known as the World Wide Web (hereinafter "the Web"). Such objects may include Web pages, Microsoft Word™ documents, Adobe PDF documents, etc., and are collectively referred to herein as "Web documents." It should be noted, however, that the present invention is not limited to use with Web documents, and may be utilized in any system which provides access to linked entities, including documents, images, videos, audio, etc. Furthermore, the term Web document is only one example of a linking or linked entity, and the two terms may be used interchangeably.

Figure 1:
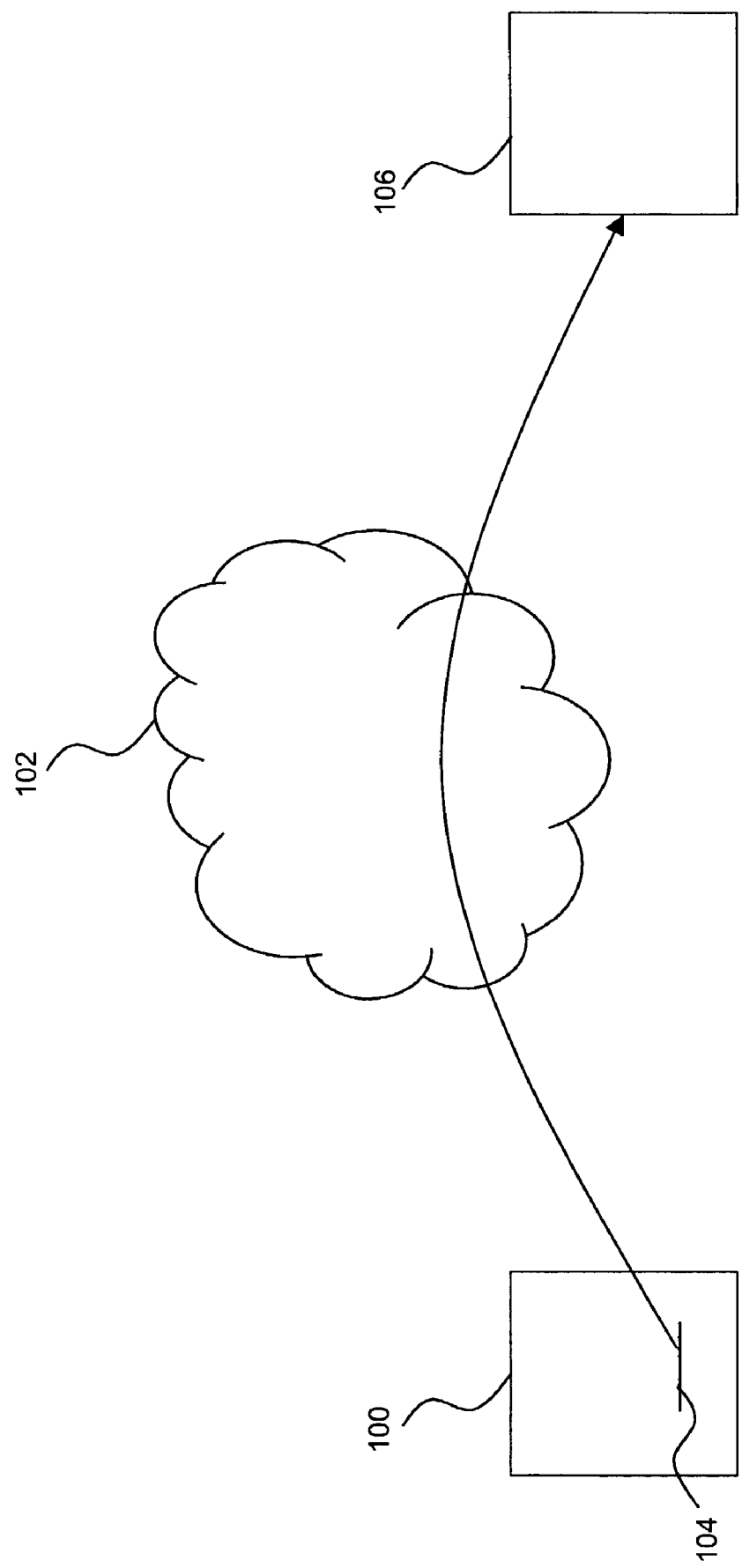
FIG. 1 is a simplified block diagram illustration of a collection of linked Web documents, useful in understanding the present invention.

Reference is now made to FIG. 1, which is a simplified block diagram illustration of a collection of linked entities, useful in understanding the present invention. It has been observed that a collection of linked entities, such as Web documents, can have a topology that is defined by hypertext links contained in the individual Web documents that identify other Web documents, such as by specifying the physical or logical location of a Web document via a Uniform Resource Locator (URL) or other known means. This is illustrated in FIG. 1 in which a Web document 100 that is accessible via a computer network 102, such as the Internet, is shown including a hypertext link 104 that directs the user to another Web document 106 that is likewise accessible via network 102. Link 104 may be defined by the combination of the source Web document 100 where link 104 is found, and by the destination Web document 106 to which link 104 refers.

Figure 2:
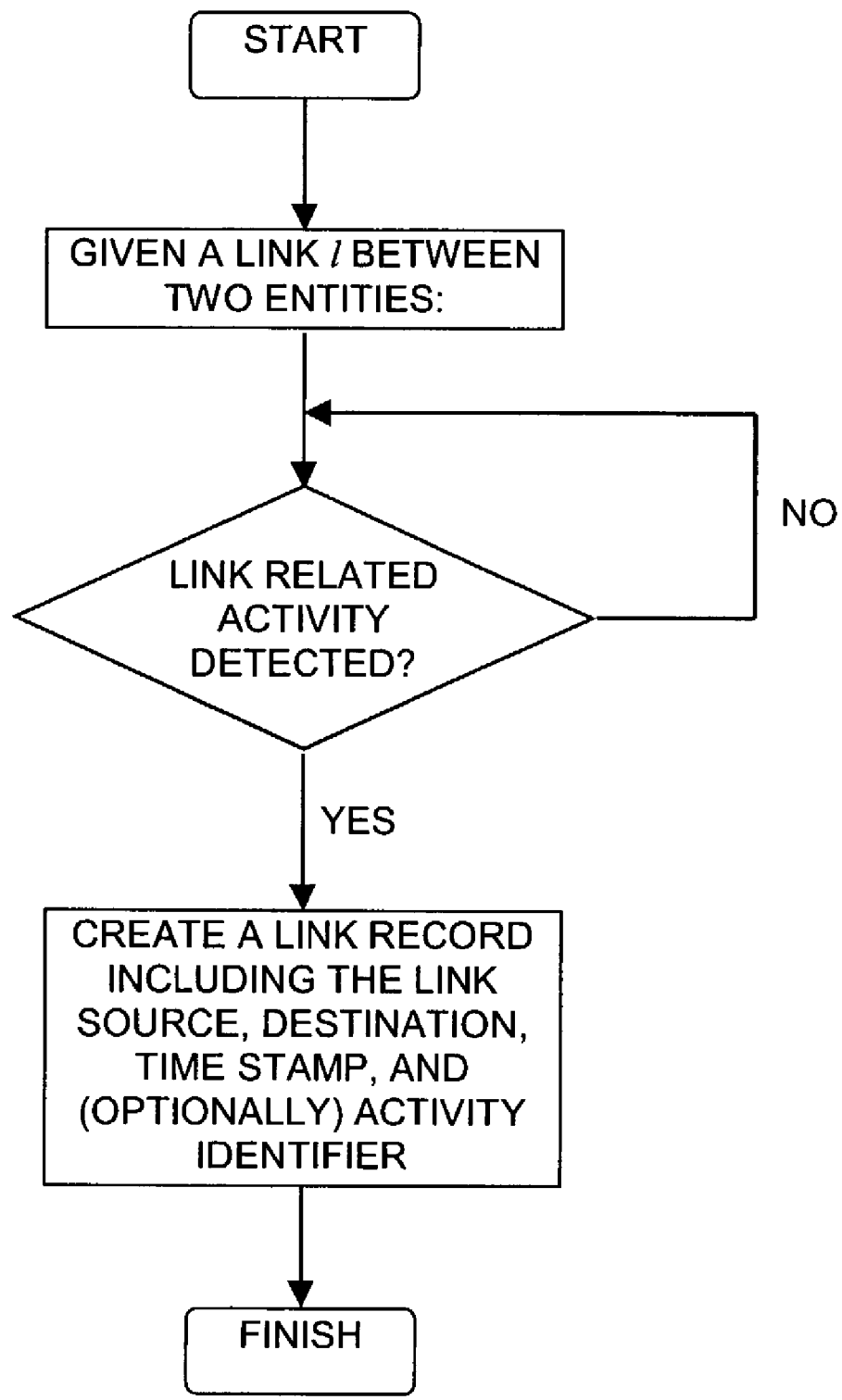
FIG. 2 is a simplified flow illustration of a method for creating a temporal record for link related activity, operative in accordance with a preferred embodiment of the present invention.

Reference is now made to FIG. 2, which is a simplified flow illustration of a method for creating a temporal record for link related activity, operative in accordance with a preferred embodiment of the present invention. In the method of FIG. 2 a link l between two entities, such as Web documents, is defined herein as l=(s,d), where s is an identifier, such as a URL, that identifies a source entity in which the link is found, where d is an identifier, such as a URL, that identifies a destination entity to which l refers. For each link l, an activity a can occur at a time t, where t represents the time stamp, defined herein as the date and/or time, when activity a related to l occurred. Activity a, referred to herein as a link related activity, may be any activity that affects the link l or its source s, including the creation of s which includes l, the addition of l to s, the modification of l within s, such as when the location of l is changed within s or when anchor text describing l is modified, the deletion of l within s, or the modification or deletion of s itself. Thus, in FIG. 2, a link activity record $l_{a,t}$ is created for each link related activity a at time t. Each link activity record $l_{a,t}$ typically includes (s,d,t) and, optionally, an identifier a describing the nature of the activity. Such information may be captured in a variety of ways, such as by the operating system on the computer where a Web document is edited, by the application that is used to edit the document, by the file transfer software that is used to upload the document to a server, etc.

Where the actual time and/or date of link related activities cannot be captured, the time stamp may be approximated. For example, a time stamp may be generated corresponding to an indicator of the last time and/or date the linking entity was modified, such as the "last modified" header field of the document. Alternatively, a time stamp may be generated corresponding to the time and/or date on which the linking entity is examined to identify the links contained within.

Figure 3:
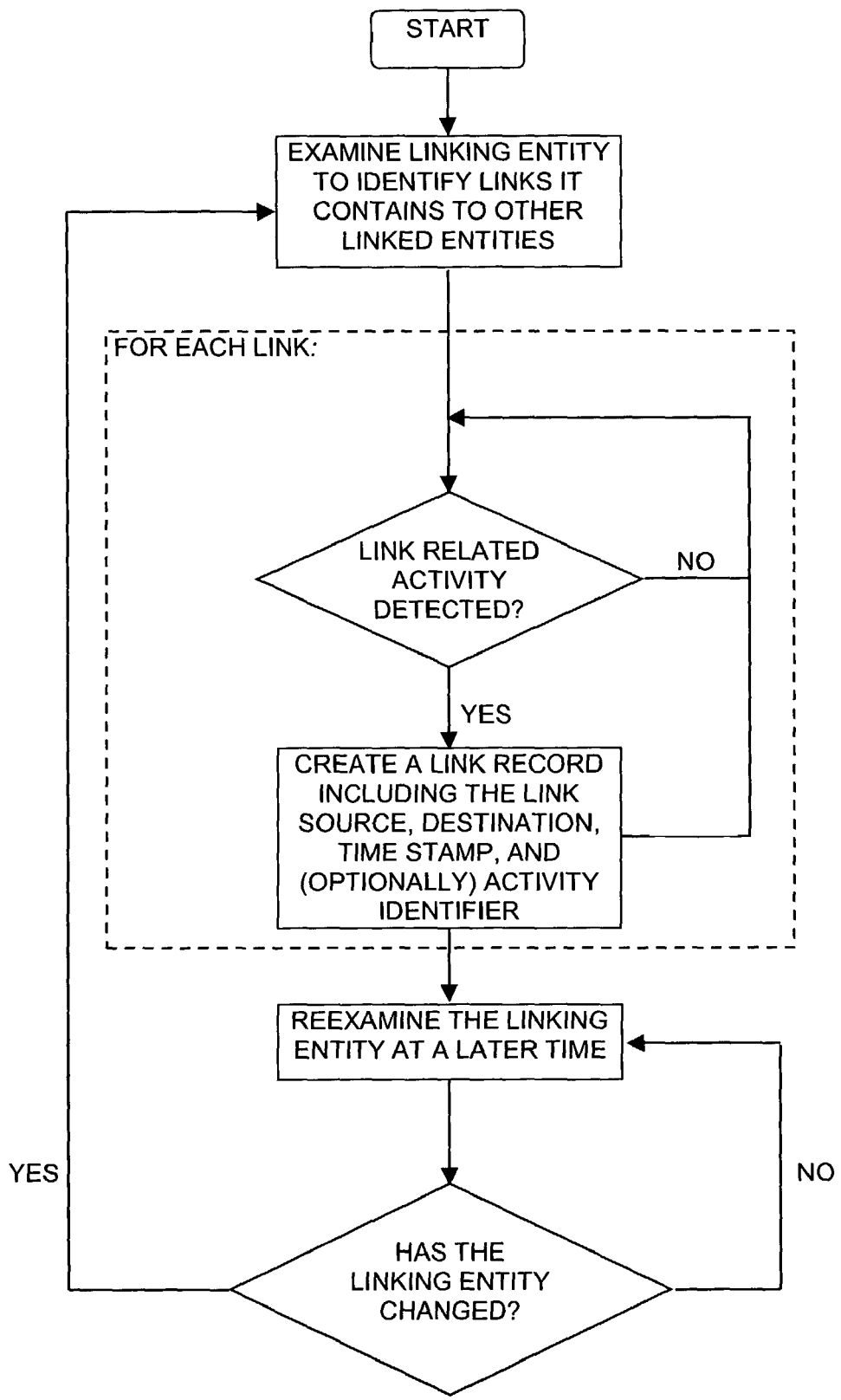
FIG. 3 is a simplified flow illustration of a method for gathering temporal information for a collection of linked entities, operative in accordance with a preferred embodiment of the present invention.

Reference is now made to FIG. 3, which is a simplified flow illustration of a method for gathering temporal information for a collection of linked entities, operative in accordance with a preferred embodiment of the present invention. In the method of FIG. 3, a series of link activity records are created for a series of link related activities. Thus, in FIG. 3, each of one or more linking entities, such as Web documents, is examined to identify one or more links it contains identifying one or more other linked entities. This may be done using any known technique, such as Web crawling techniques. A link activity record is then generated as described above for each link for which link related activity is detected, such as is described hereinabove with reference to FIG. 2. Using conventional techniques, the linking entity is subsequently examined to determine whether it has changed since the last time it was examined. This may be performed, for example, by comparing the currently accessed Web document or a portion thereof, such as the value of a last modified header field of the linking entity, with a previously stored version of the document or a portion thereof. If link related activity is detected a link activity record is then generated.

Figure 4A:
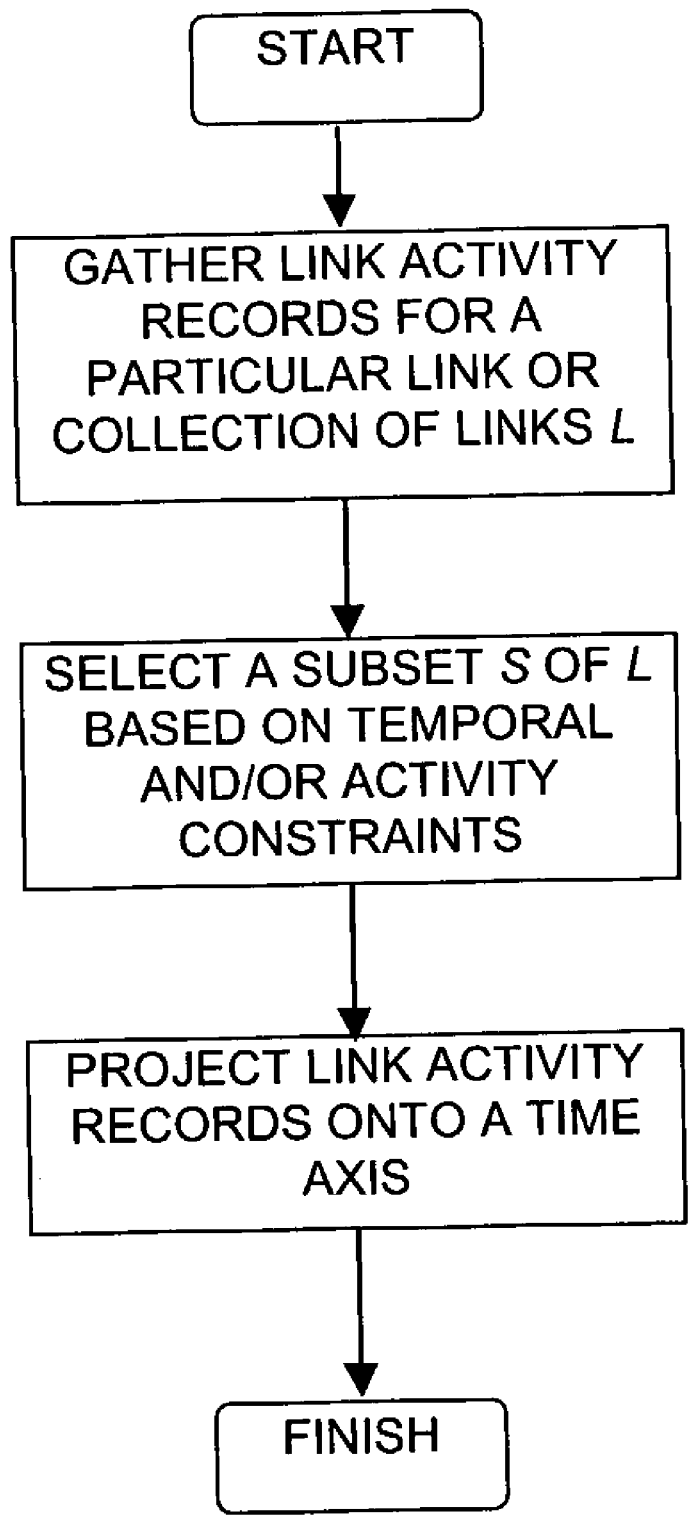
FIG. 4A is a simplified flow illustration of a method for measuring link activity as a function of time, operative in accordance with a preferred embodiment of the present invention.
Figure 4B:
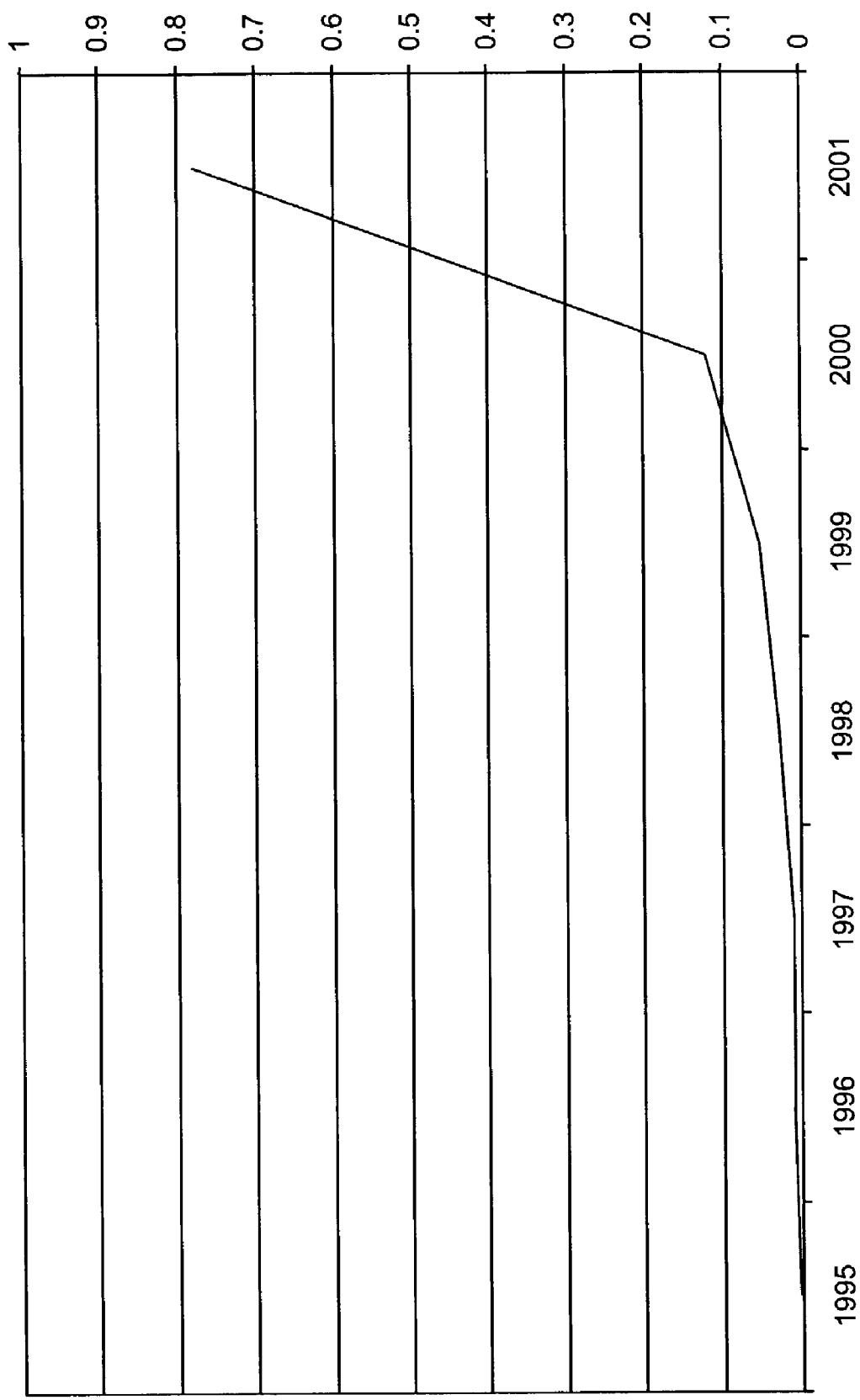
FIGS. 4B and 4C are simplified graphical illustrations depicting the results of exemplary implementations the method of FIG. 4A.
Figure 4C:
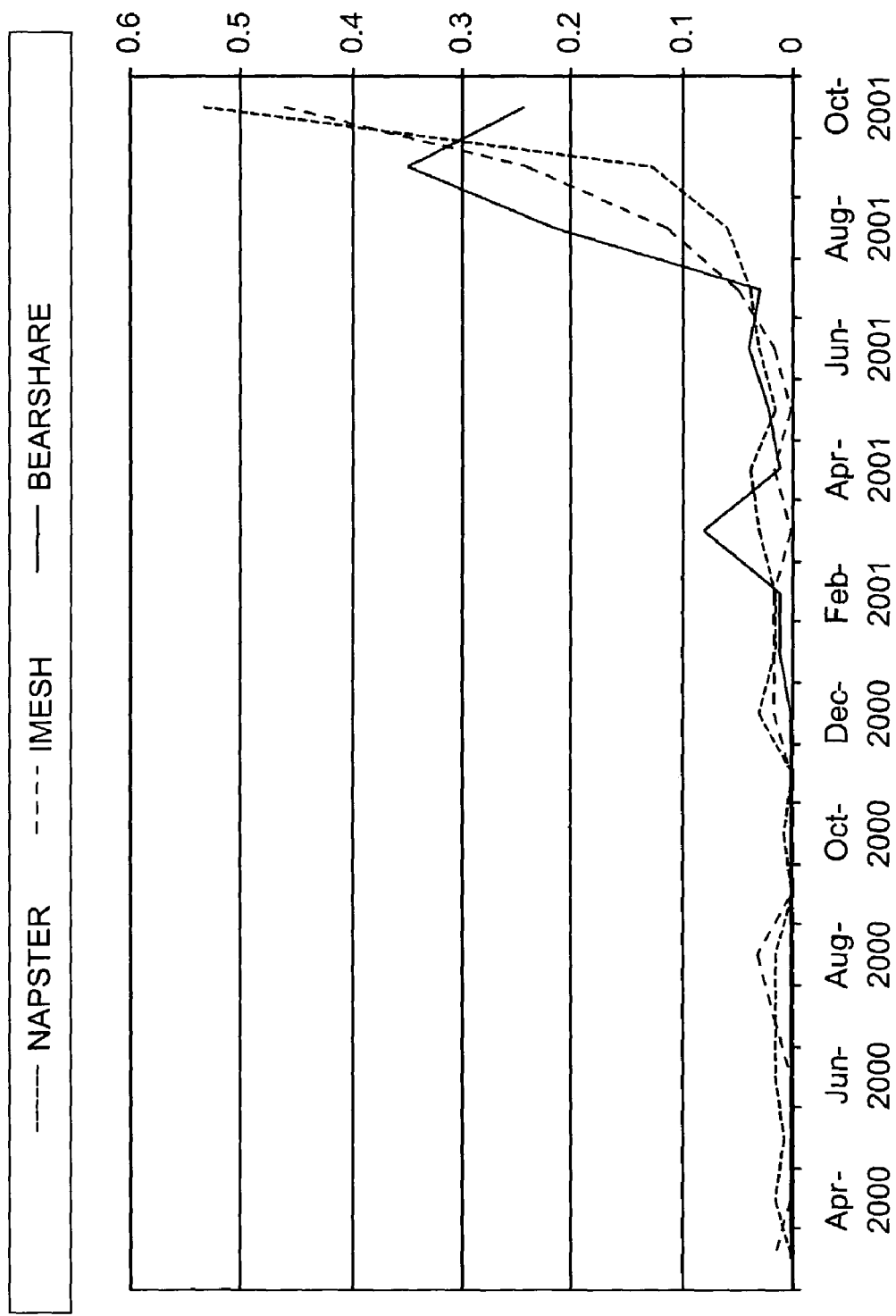

Reference is now made to FIG. 4A, which is a simplified flow illustration of a method for measuring link activity as a function of time, operative in accordance with a preferred embodiment of the present invention, and additionally to FIGS. 4B and 4C, which are simplified graphical illustrations depicting the results of exemplary implementations of the method of FIG. 4A. Once gathered, link activity records may be used to measure the activity within a collection of linked entities as a function of time. Members of such a collection could, for example, be related by a common topic or concept. A Temporal Link Profile (TLP) of a collection of linked entities is defined herein as a normalized projection of the collection's link activity records onto a time axis. Thus, a TLP measures the relative number of link activity records for a particular link that are associated with every time interval. It may also be understood as the temporal distribution of a link or a class of links over time.

In the method of FIG. 4A, a TLP is plotted from link activity records for a set L of links. Set L could, for example, include one or more links to a collection C of one or more linked entities, where each member of C is recorded as a link destination. Each link activity record is projected onto a time axis with a predefined granularity. In one embodiment, only a subset of all the link activity records for a given link are plotted, such as the most recent link activity record for a given link. In another embodiment, in order to detect abnormal temporal changes in the activity around a concept's very recent past (e.g. a week before), a series of TLPs for the same set L of one or more links with link activity records selected based on predefined temporal criteria, such as those that are dated in a given time period, are overlaid onto a single plot using any known graph addition or aggregation technique to form a "disjoint" TLP where each link activity record is plotted only once. In yet another embodiment, the subset of projected link activity records can be selected based on specific types of activity, such as where only deletion or addition records are plotted.

FIG. 4B shows an aggregate TLP of approximately 5,000 link activity records, collected for approximately 90 different documents. As is evident from the TLP of FIG. 4B, the number of link activity records increases over time, with most of the link activity records being relatively recent. A TLP of a collection of linked entities relating to a particular concept may thus be used to discover abnormal changes in the activities within a concept's community of related documents, with a major deviation from a typical TLP providing an indication that a major event has occurred with respect to the concept.

Another use of the TLP is in comparing between changes in the activity levels in communities of related concepts. FIG. 4C shows the TLPs of Web sites of three popular file-sharing applications. The graph clearly shows that two of the file-sharing applications' sites exhibit similar TLPs, while the TLP of Bearshare.com differs dramatically in that the number of its link activity records in the late months of 2001 drops with respect to the levels of August, 2001. The BearShare client of Gnutella received a lot of industry attention around the beginning of 2001, but was reported to be an unstable application by its users somewhere in early/mid-2001. In September 2001 a new version of the BearShare client was released. However, in many user forum discussions around this time BearShare was accused of using "spyware," downloading or exporting user information without receiving the user's permission. Such behavior in the file-sharing user community is not greatly appreciated. The reported developments may have slowed the growth of the BearShare community and caused many of its users to stop updating BearShare links on their Web pages.

Figure 5:
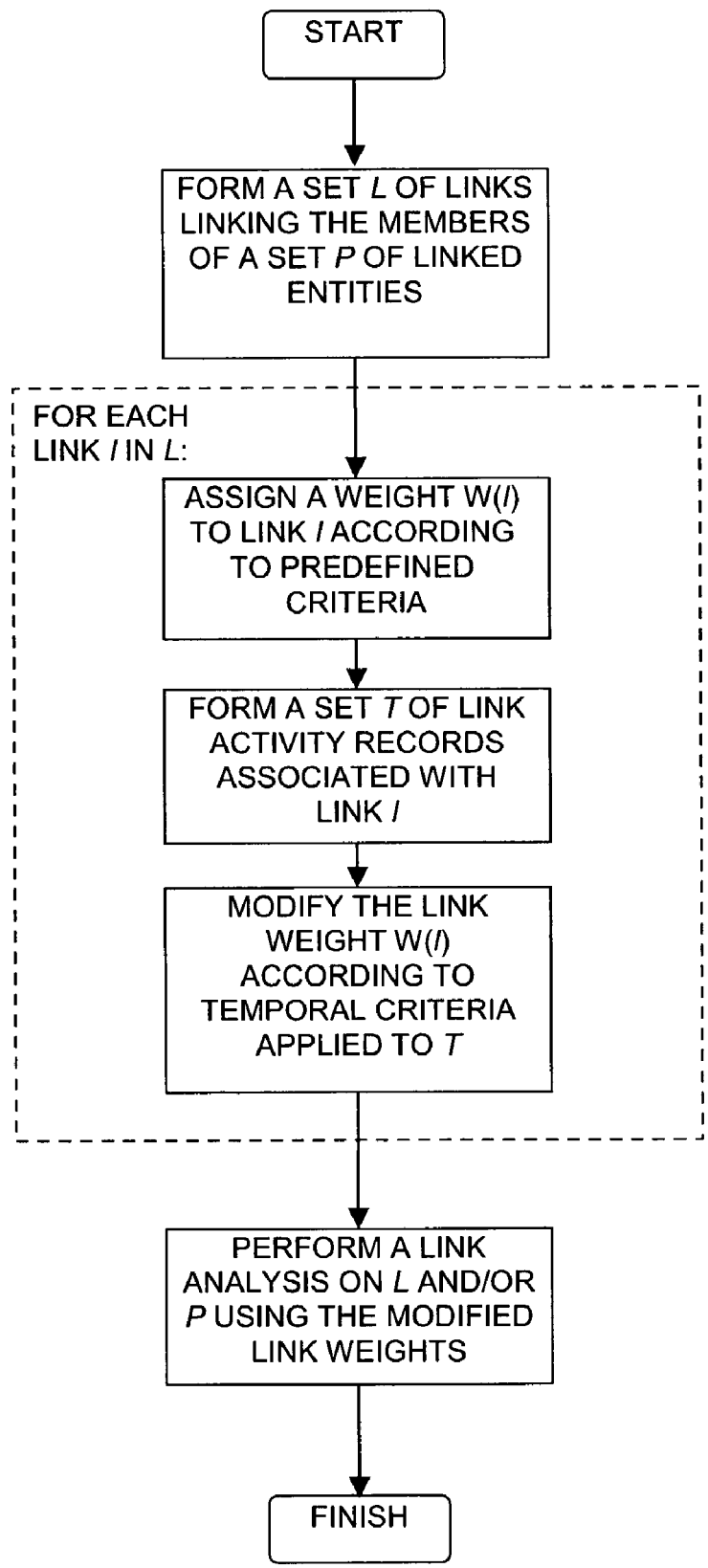
FIG. 5 is a simplified flow illustration of a method for temporally ranking a collection of linked entities, operative in accordance with a preferred embodiment of the present invention.

Reference is now made to FIG. 5, which is a simplified flow illustration of a method for temporally ranking a collection of linked entities, operative in accordance with a preferred embodiment of the present invention. In the method of FIG. 5, a set L is formed of links linking members of a set P of linked entities. Each link l in L is defined by its source s (an element of P) and destination d (another element of P). The sets P and L may be formed using any conventional technique, such as by querying a search engine to obtain a collection of linked documents (P), and analyzing the documents in that collection to extract the set of links (L) between members of P. Each link l in L is then assigned a weight W(l) according to predefined criteria, such as are employed by page ranking algorithms. For each link l in L a set T is formed of the link activity records associated with it. Weight W(l) may then be modified according to temporal criteria applied to the members of T. For example, a link with numerous and/or recent link activity records may receive a greater weight than a link with fewer and/or older link activity records. The modified weights may then be used as part of a link analysis method, such as where for each linked entity in P, the weights of the links to the linked entity are aggregated, and the linked entities are ranked according to their aggregated weight. Such temporal weighting may similarly be applied by algorithms that take into account more than one level of links, such as where the weight of links having s as their destination may affect entities pointed to by s.

It is appreciated that such weighting may be used in conjunction with other known weighting techniques, such as where a link is weighted according to the anchor text that is associated with it and the similarity of the anchor text to the query. For example, the anchor text may be evaluated to assess its relevance to the query using conventional techniques, resulting in an anchor score. The initial weight of the link may reflect the anchor score and, optionally, other known non-temporal factors. A difference d between the date and/or time of the query and the time stamp of the most recent link activity record is then calculated. The weight of the link is then modified by adding a bonus or a penalty depending on the activity associated with link activity record. For example, for add and modify related activities the weight may be adjusted as follows:

if (d<1 week) then bonus=1.5
if (d>=1 week and d<1 month) bonus=1.0
if (d>=1 month and d<6 months) bonus=0.5
if (d>=6 months and d<1 year) bonus=0.25
if (d>=1 year) bonus=0.0

While for deletion activity records we could adjust as follows:

if (deletion occurred<1 week) penalty=−1.5
if (deletion occurred>=1 week) penalty=−1.0

Time, which has been recognized as an important dimension in co-citation analysis of printed literature, has not yet been incorporated into the analogous process of link analysis on the Web. The present invention introduces several aspects and uses of the time dimension in the context of Web information retrieval, including methods for determining the age of links and ranking search engine query results based on temporal information.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for analyzing linked entities, comprising:
identifying one or more destination documents and a collection of source documents that contain hypertext links that identify one or more of the destination documents by specifying respective locations of the destination documents;
detecting changes in the source documents;
creating, on a computer, link activity records responsively to the detected changes, each link activity record comprising:
an identification of a respective destination document and of a respective source document in which a change was made and which contains a link to the respective destination document; and
a time stamp indicative of a time at which the change was made; and
collecting the link activity records with respect to the links from a plurality of the source documents to a given destination document, and processing the collected link activity records in order to discover changes in an activity level indicated by a number of the link activity records associated with the collection over time.

2. The method according to claim 1, wherein detecting the changes comprises detecting an addition of a link in one of the source documents.

3. The method according to claim 1, wherein detecting the changes comprises detecting a modification of anchor text associated with a link in one of the source documents.

4. The method according to claim 1, wherein detecting the changes comprises detecting that a location of link in one of the source documents has changed.

5. The method according to claim 1, wherein detecting the changes comprises detecting a deletion of a link in one of the source documents.

6. The method according to claim 1, wherein detecting the changes comprises crawling over a document collection in order to identify and detect the changes in the source documents.

7. The method according to claim 1, wherein processing the collected link activity records comprises sorting the link activity records according to the time stamp.

8. The method according to claim 7, wherein processing the collected link activity records comprises projecting an indication of the activity level onto a time axis.

9. The method according to claim 8, wherein projecting the indication comprises measuring a respective number of the link activity records occurring in each of a sequence of time intervals on a time axis.

10. The method according to claim 9, wherein processing the collected link activity records comprises identifying a trend in the activity level with respect to one or more of the documents.

11. The method according to claim 9, wherein processing the collected link activity records comprises comparing the respective number of the link activity records that are associated with the links to each of two or more of the destination documents in the sequence of the time intervals in order to detect an abnormal change in the activity level of at least one of the destination documents.

12. The method according to claim 7, wherein processing the collected link activity records comprises identifying and displaying a most recent respective link activity record for each of a plurality of the links.

13. The method according to claim 1, wherein processing the collected link activity records comprises assigning respective weights to the links responsively to the link activity records, and ranking a group of the documents according to the weights of the links that are respectively associated with the documents.

14. The method according to claim 13, wherein assigning the respective weights comprises assigning a respective weight to each link responsively to the time stamp of at least one of the link activity records that is associated with the link.

15. The method according to claim 14, wherein assigning the respective weight comprises assigning greater weight responsively to recent link activity records that are indicative of addition or modification of the links than to older link activity records.

16. The method according to claim 14, wherein assigning the respective weight comprises reducing the respective weight of a given link responsively to a link activity record indicative of a deletion of the given link.

17. The method according to claim 13, wherein the group of the documents comprises a plurality of the destination documents, and wherein ranking the group of the documents comprises aggregating the respective weights of the links to each of the destination documents, and ranking the destination documents according to the aggregated weights.

18. The method according to claim 13, wherein assigning the respective weights comprises assigning a respective weight to each link responsively to a number of the link activity records that are associated with the link.

* * * * *